United States Patent
David et al.

(10) Patent No.: US 6,722,392 B1
(45) Date of Patent: Apr. 20, 2004

(54) ASSEMBLY COMPRISING A TUBE AND A SLEEVE

(75) Inventors: Laurent David, Juvisy sur Orge (FR); Michael Mittelstaedt, Bois le Roi (FR)

(73) Assignee: Gitzo Holding Societe Anonyme, Creteil (FR)

( * ) Notice: Subject to any disclaimer, the term of this patent is extended or adjusted under 35 U.S.C. 154(b) by 0 days.

(21) Appl. No.: 10/030,148

(22) PCT Filed: Jul. 13, 2000

(86) PCT No.: PCT/FR00/02027

§ 371 (c)(1), (2), (4) Date: May 2, 2002

(87) PCT Pub. No.: WO01/07815

PCT Pub. Date: Feb. 1, 2001

(30) Foreign Application Priority Data

Jul. 26, 1999 (FR) .............................................. 99 09644

(51) Int. Cl.⁷ .............................. F16L 11/08; F16L 9/12
(52) U.S. Cl. ..................... 138/109; 138/96 T; 138/155; 285/285.1; 285/293.1; 428/36.9
(58) Field of Search ................................. 138/109, 145, 138/146, 125, 137, 174, 177, 178, 172, 96 T, 96 R, 155; 428/36.9, 36.91; 285/285.1, 293.1

(56) References Cited

U.S. PATENT DOCUMENTS

| | | | | |
|---|---|---|---|---|
| 4,089,190 A | * | 5/1978 | Worgan et al. ............. 464/180 |
| 4,171,626 A | * | 10/1979 | Yates et al. ................. 464/181 |
| 4,421,497 A | * | 12/1983 | Federmann et al. ........ 464/181 |
| 4,729,806 A | | 3/1988 | Stein ........................... 156/172 |
| 4,811,626 A | * | 3/1989 | Bezin ......................... 74/594.1 |
| 4,830,694 A | * | 5/1989 | Kanao ......................... 156/143 |
| 4,921,283 A | | 5/1990 | Schaffner et al. ........... 285/114 |
| 5,398,975 A | | 3/1995 | Simmons ..................... 285/93 |
| 5,443,099 A | * | 8/1995 | Chaussepied et al. ....... 138/109 |
| 5,582,238 A | * | 12/1996 | Plaschkes ..................... 165/56 |
| 5,638,870 A | * | 6/1997 | Takada et al. .............. 138/125 |
| 5,895,695 A | * | 4/1999 | Rowley .................... 428/36.9 |
| 5,914,163 A | * | 6/1999 | Browne ..................... 428/36.1 |
| 5,996,638 A | * | 12/1999 | Schippl ..................... 138/112 |
| 6,012,743 A | * | 1/2000 | Godeau et al. .......... 285/286.2 |

* cited by examiner

Primary Examiner—Patrick Brinson
(74) Attorney, Agent, or Firm—Westerman, Hattori, Daniels & Adrian LLP

(57) ABSTRACT

The invention concerns an assembly comprising a tube in composite material including carbon fibers embedded in a resin, an extremity of which is equipped with a sleeve in plastic material such as polyamide, optionally equipped with a jointing thread. According to the invention, the tube comprises at least one layer of composite material, and the sleeve is obtained by overmolding injection of material on the tube. Preferably, the composite material constituting the tube comprises two adjacent layers of carbon fibers embedded in carbon, the inner layer being a layer whose fibers are substantially longitudinal, whereas the outer layer comprises helically arranged fibers.

16 Claims, 3 Drawing Sheets

ASSEMBLY COMPRISING A TUBE AND A SLEEVE

The present invention concerns tubes in composite material including carbon fibers embedded in a resin and, more particularly, such tubes of which at least one extremity is equipped with a sleeve allowing two coaxial tubes to be immobilized together. The invention also concerns support devices of the three-leg or one-leg type, for example used in the field of filming or measurement taking.

It is well known that the use of composite materials including carbon fibers embedded in an epoxy resin brings characteristics of a higher mechanical resistance for a relatively low weight.

Document FR-A-2 772 301 describes such an element in composite material and its fabrication process. A gel is disposed on a mandrel so as to create a superficial layer which provides good sliding characteristics on the internal wall of the finished tube, then it is prepolymerized. Subsequently, the layers of fabric with carbon fibers are applied and cooked at appropriate temperature until complete polymerization. An exterior layer of an additional gel can promote the constitution of an exterior surface with a low friction coefficient.

The tubes or cylinders in carbon can only be made with relatively short lengths, which makes it necessary, for many applications, to realize a connection between several successive tubes to obtain the required length for the application.

Document U.S. Pat. No. 4,941,692 thus provides profiled adhesive couplings between successive tubes, where a sleeve in appropriate resin also containing carbon fibers is placed in the junction zone to reinforce the longer tube thus obtained.

When the tubes must present lengths which are able to vary, it is preferable to use a telescopic assembly utilizing the gels of document FR-A-2 772 301 to ensure the relative sliding of the tubes. However, in that case, a means for fixing the total length is required. An extremity of the tube is then advantageously provided with a sleeve optionally equipped with a thread to allow cooperation with a tightening part or the like. In such case, the sleeve must be solidly anchored to the carbon tube, which is contrary to the low superficial friction coefficient of the carbon tubes.

The present invention is situated in this context and provides an assembly comprising a primary tube in composite material equipped with a sleeve which makes it possible to avoid the above-described drawbacks, the sleeve being provided to ensure a junction by tightening of a coaxial secondary tube.

According to the invention, the assembly comprises a primary tube in composite material including carbon fibers embedded in a resin, one extremity of which is equipped with a sleeve in plastic material, such as a polyamide, optionally equipped with a jointing thread, the sleeve being obtained by overmolding injection of material on the tube.

Preferably, the tube comprises at least two adjacent layers of carbon fibers, the inner layer being a layer whose fibers are substantially longitudinal, whereas the outer layer comprises helically arranged fibers.

Preferably, the material constituting the sleeve is reinforced with short fibers, so as to have a thermic dilatation coefficient approximately equivalent to that of the tube over a temperature range comprised between about −50° C. and about +100° C. These short fibers can advantageously be glass fibers.

Advantageously, the extremity of the tube equipped with the sleeve has a plurality of embossments which are filled with the sleeve material during the overmolding injection step.

The invention will be better understood, and other purposes, advantages and characteristics of the invention will appear more clearly from the following description of preferred embodiments, which are presented in a non-limiting way and to which two drawing sheets are annexed, in which.

Figure 1:
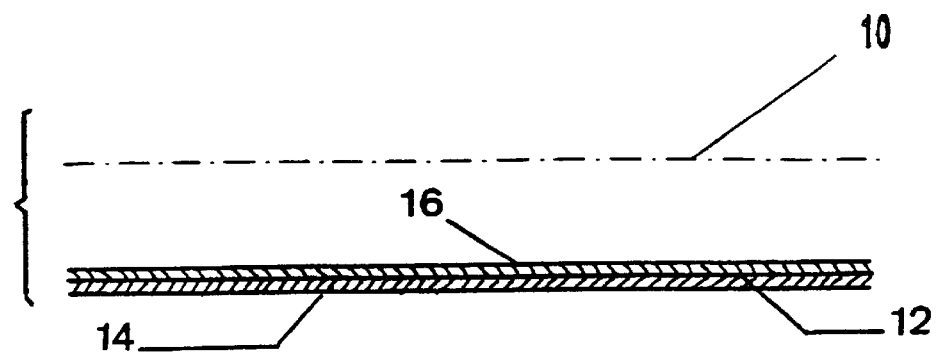
FIG. 1 is a schematic cross-sectional view of a tube in composite material according to the invention.

In reference now to the Figures which have just been described, the tube according to the invention has been schematically shown in longitudinal cross-section on FIG. 1. Such a tube can be the primary tube or a secondary tube coaxial with the primary tube and telescopically sliding. The tube has an axis of revolution 10 and comprises, in the example shown, two adjacent layers 12, 14 of carbon fibers embedded in an epoxy resin. Of course, the tube can comprise other layers including or not including carbon fibers.

The inner layer 12 includes fibers which are substantially parallel to the axis 10 of the tube, i.e., longitudinal fibers, whereas the outer layer 14 includes fibers which are helically arranged, and optionally crossed.

As a result, a high rigidity of the tube is obtained and any bending of the longitudinal axis 10 is substantially avoided, in particular when the tube is used cantilevered.

Preferably, the internal wall of the tube is covered with a polymerized gel ensuring a low friction coefficient promoting a telescopic use of several coaxial tubes.

An extremity of the primary tube is equipped with a sleeve 30 such as shown on FIG. 3. This sleeve 30 is obtained by direct overmolding injection on the tube of a material such as a polyamide reinforced with fibers.

Figure 2A:
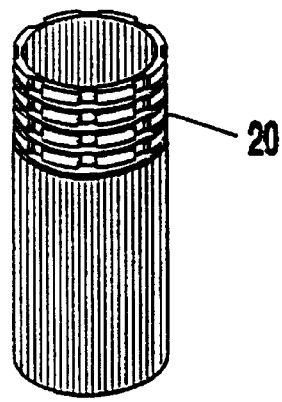
FIGS. 2a and 2b are illustrative views of two types of anchoring embossments of a sleeve on an extremity of the carbon tube.
Figure 2B:
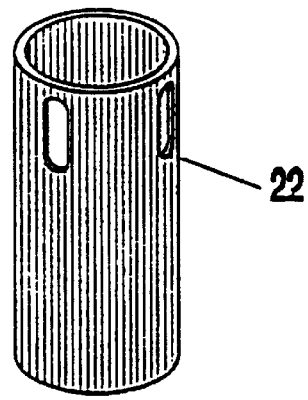

To promote a good anchoring of the sleeve 30 on the tube, the concerned extremity of the tube has a plurality of embossments 20, 22, as shown on FIGS. 2a and 2b. On FIG. 2a are shown embossments in the form of axial grooves 20, and on FIG. 2b are shown embossments in the form of elliptic openings 22.

Any other form of embossments can be selected, such as longitudinal grooves, superficial corrugations, circular or helix-shaped grooves, rounded openings, as well as any combination of these embossments in function of the desired connection (in rotation and/or in axial translation).

Preferably, these embossments only concern the outer layer 14 of the tube so as not to affect the global rigidity of the tube; in that case, they are called blind. However, they can be formed by opening affecting or passing through both layers 12, 14 of the composite material including carbon fibers.

Characteristically, such a tube is made by means of a pin (not shown) whose exterior diameter is approximately equal to the internal diameter of the tube. An anti-friction gel 16 is first pre-polymerized, then it is covered with the two layers 12 and 14 of epoxy resin containing the carbon fibers. After hardening, the embossments 20, 22 are obtained by partial machining of the tubes, before or after cutting the tube at the desired length.

The extremity to be equipped with a sleeve is then covered with an injection mold for a polyamide-based material. This material is preferably reinforced with short fibers, for example glass fibers, in such an amount that the respective dilatation coefficient of the tube and the sleeve are approximately identical over an operation range planned to be between about −50° C. and about +100° C. The material is then injected into the mold and hardened.

In this way, the injected material directly fills the embossments 20, 22 to ensure the desired connection.

Figures 3A, 3B:
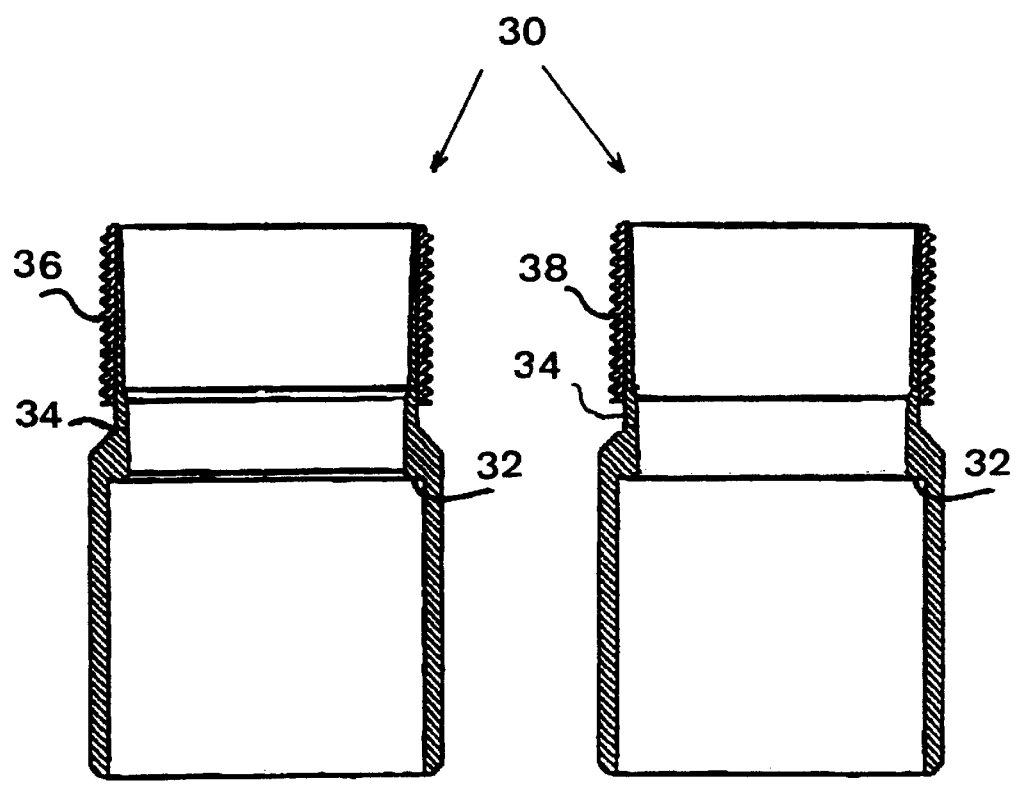
FIGS. 3a and 3b are schematic cross-sectional views of two examples of appropriate sleeves according to the invention.
Figure 4:
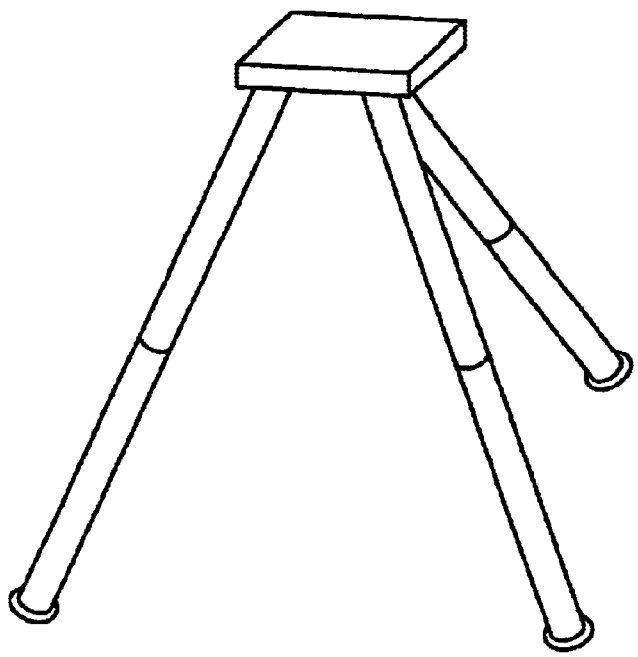
FIG. 4 is a schematic view of a support device comprising legs formed by tubes and sleeves according to the present invention.

The sleeve 30 can have various forms, only two of which have been illustrated on FIGS. 3a and 3b. The sleeve 30 has a shoulder 32 against which the tube abuts. A neck 34 will receive a tightening means. On FIG. 3a, this tightening means cooperates with a threaded ring in aluminum 36 collared on the neck 34. On FIG. 3b, it cooperates directly with a threaded portion 38 provided on the neck.

In a use of the telescopic type, an exterior tube abuts against the shoulder 32, while an interior tube has an exterior diameter approximately equal to the interior diameter of the neck 34. The two tubes are then locked in relative position, either by providing at least one longitudinal slit in the neck 34 of the sleeve 30, or by providing a plastic ring between the neck 34 and the interior tube, so that the sleeve 30 presses the interior tube directly or through the plastic ring when the tightening means is threaded on thread 36, 38.

The person of the art will have understood that it is thus possible to use the assembly just described to constitute at least one leg of a support for a filming or measurement taking apparatus.

In an exemplary embodiment, the exterior diameter of the tube was 24 mm, while the interior diameter of the neck 34 of the sleeve 30 was 21 mm. The sleeve extended over a length of about 25 mm of the tube, and the length of the neck was in the order of 14 mm. The grooves 20 (FIG. 2a) or the openings 22 (FIG. 2b) penetrated in the outer layer 14 of the carbon tube by about 0.5 mm. In another example, the openings 22 passed through both layers.

Although what is presently considered the preferred embodiments of the present invention has been described, it is obvious to a person of the art to add various changes and modifications without being outside the scope of the present invention as defined in the following.

What is claimed is:

1. Assembly comprising a tube in composite material including carbon fibers embedded in a resin, an extremity of which is equipped with an overmold sleeve in plastic material suitable for overmolding injection which is reinforced with short fibers, wherein said sleeve is obtained by overmolding injection of material on the tube.

2. Assembly according to claim 1, wherein said composite material constituting said tube comprises two adjacent layers of carbon fibers embedded in carbon, the inner layer being a layer whose fibers are substantially longitudinal, whereas the outer layer comprises helically arranged fibers.

3. Assembly according to claim 1, wherein the material constituting said sleeve is reinforced with short fibers so as to provide it with a thermal dilatation coefficient approximately equivalent to that of the tube over a temperature range comprised between about −50° C. and about +100° C.

4. Assembly according to claim 3, wherein said short fibers are glass fibers.

5. Assembly according to claim 1, wherein the extremity of said tube equipped with said sleeve has a plurality of embossments which are filled with said material of said sleeve during the overmolding injection step.

6. Assembly according to claim 5, wherein said embossments only affect said outer layer of said tube.

7. Assembly according to claim 5, wherein said embossments are selected among axial and longitudinal grooves, similar superficial corrugations, circular grooves, helix-shaped grooves, traversing or blind openings of all shapes, and combinations of those.

8. Assembly according to claim 1, wherein the tube is made on a rigid pin whose external diameter is approximately equal to the internal diameter of said tube.

9. Assembly according to claim 1, wherein said tube receives in a telescopic manner another coaxial tube having a smaller diameter.

10. Support device, in particular for filming apparatus, which comprises at least one leg conformed as the assembly according to claim 1.

11. Assembly according to claim 1, wherein the plastic material is polyamide.

12. Assembly according to claim 1, wherein the sleeve is equipped with a jointing thread.

13. Assembly according to claim 2, wherein the material constituting said sleeve is reinforced with short fibers so as to provide it with a thermal dilatation coefficient approximately equivalent to that of the tube over a temperature range comprised between about −50° C. and about +100° C.

14. Assembly according to claim 13, wherein said short fibers are glass fibers.

15. Assembly according to claim 6, wherein said embossments are selected among axial and longitudinal grooves, similar superficial corrugations, circular grooves, helix-shaped grooves, traversing or blind openings of all shapes, and combinations of those.

16. Assembly according to claim 1 comprising a tube in composite material including carbon fibers embedded in a resin, an extremity of which is equipped with a sleeve in plastic material, wherein said sleeve is obtained by overmolding injection of material on the tube such that said sleeve protrudes beyond an extremity of the tube for ensuring a junction with another tube.

* * * * *